Jan. 31, 1956    A. R. COVIELLO    2,732,781
AGRICULTURAL IMPLEMENTS AND SUPPORT VEHICLES THEREFOR
Filed July 23, 1951    3 Sheets-Sheet 2
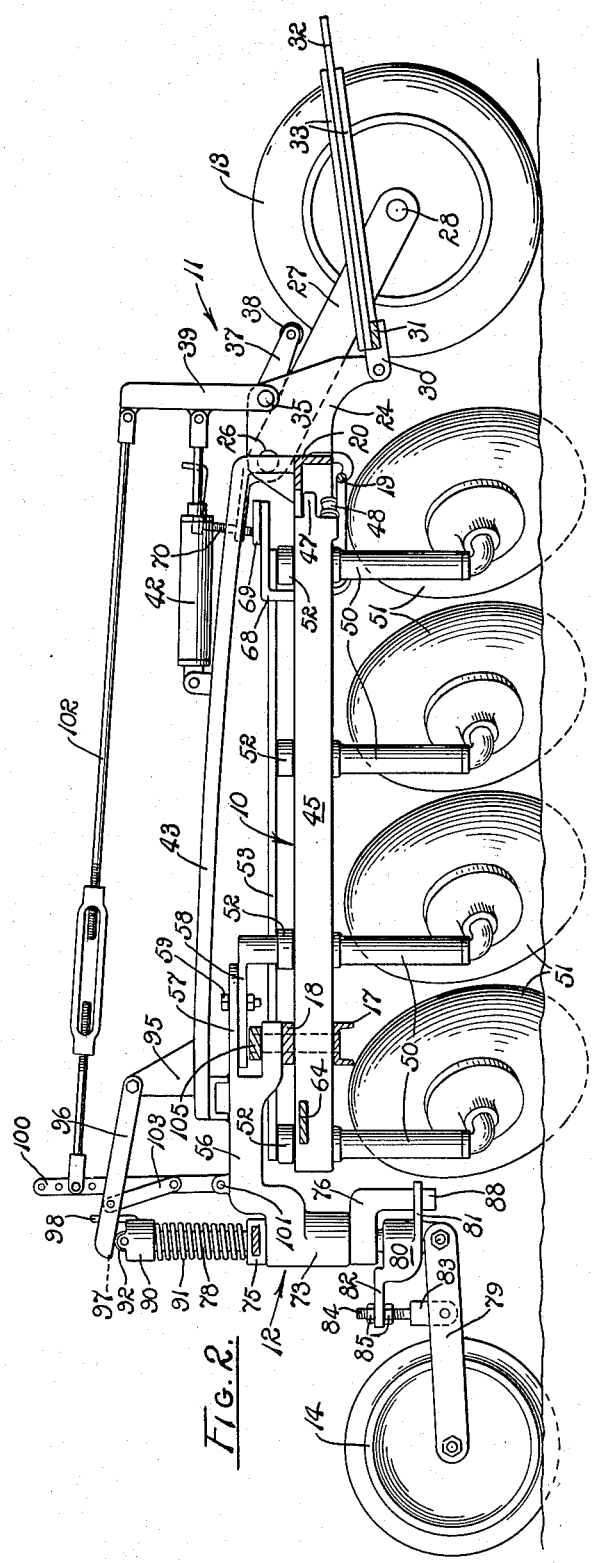
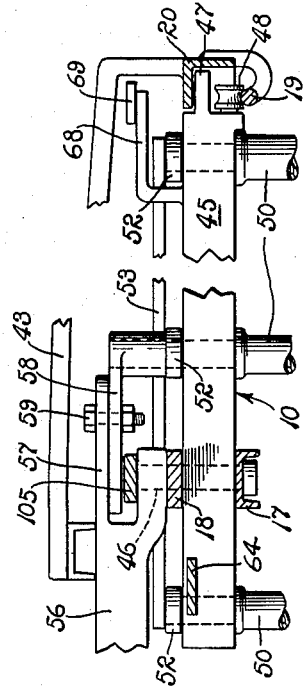
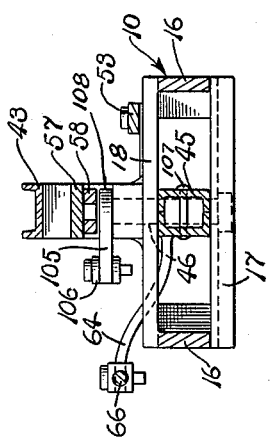
ANTHONY R. COVIELLO
INVENTOR
HUEBNER, BEEHLER,
WORREL & HERZIG
ATTORNEYS

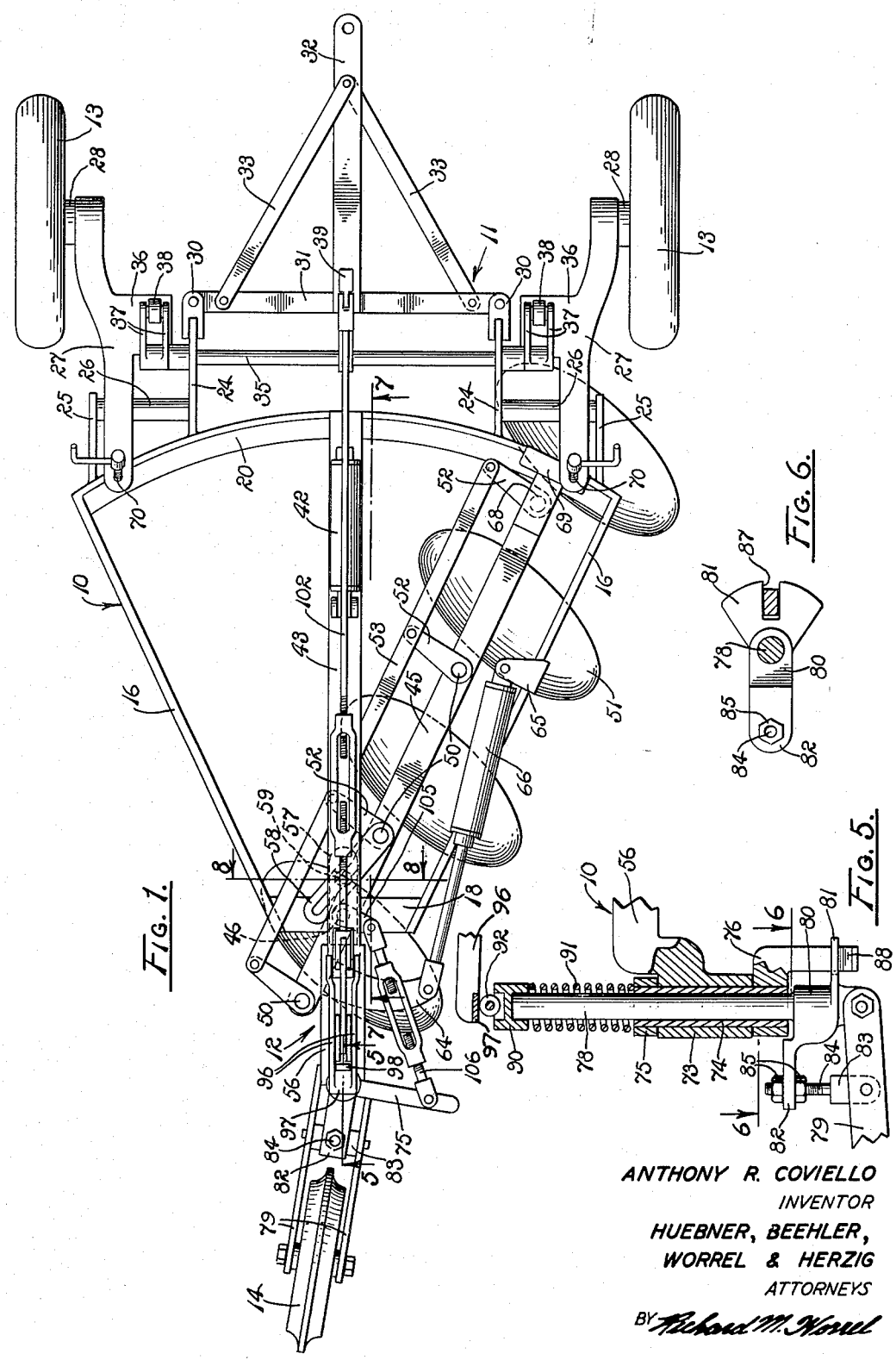

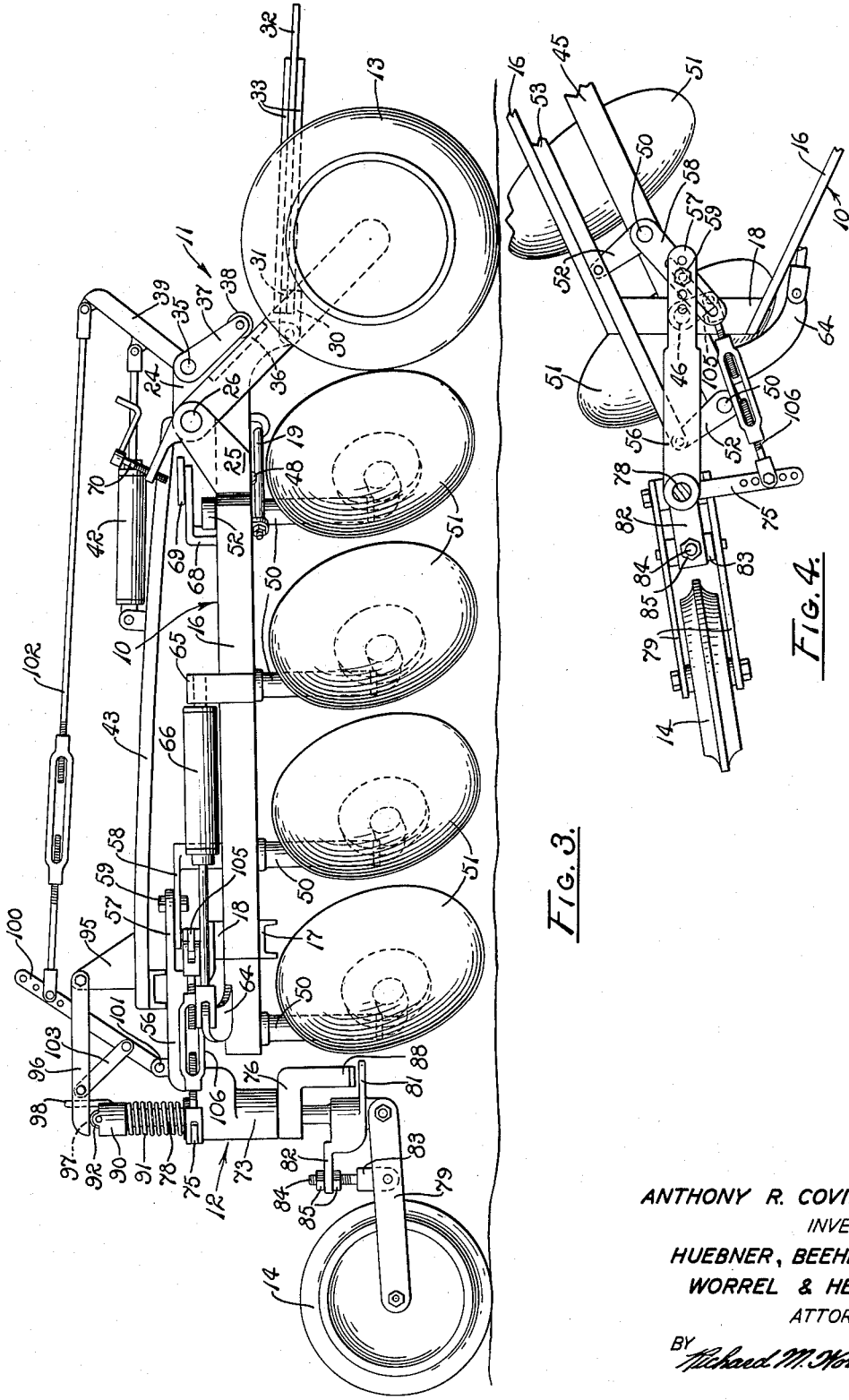

United States Patent Office 2,732,781
Patented Jan. 31, 1956

2,732,781

AGRICULTURAL IMPLEMENTS AND SUPPORT VEHICLES THEREFOR

Anthony R. Coviello, Tulare, Calif.

Application July 23, 1951, Serial No. 238,065

16 Claims. (Cl. 97—32)

The present invention relates to agricultural implements and more particularly to an improved support vehicle or draft frame for earth working tools and the like.

The subject invention constitutes an improvement of the reversible plow comprising the subject matter of my United States Patent No. 2,600,359, granted June 2, 1952, but as will become apparent, is not limited to embodiment in reversible plows or even agricultural implements generally, it being implicit to the basic concept thereof that the invention possess utility in support vehicles generally wherein comparable operational problems are encountered.

The above identified patent discloses a reversible plow in which disc plow blades are selectively positionable to work encountered earth laterally to either side of a line of earth traversing travel while in earth engagement. Such blades are subjected to a thrust laterally of the line of travel opposite that toward which the encountered earth is worked. This tends to cause the implement to drift laterally of the line of travel. Provision was made of a rudder member in earth engagement and a control linkage responsive to positioning of the disc blades which automatically angled the rudder member in earth engagement to compensate for lateral thrust of the disc blades. Obviously the rudder member is needed to compensate for lateral thrust of the disc blades only when the disc blades are in earth engagement. The reversible plows of the above identified patent are frequently mounted directly on elevationally positionable tool bars for the concurrent movement of the rudder member and disc blades to and from earth engagement. Thus, the disc blades and the rudder member are lifted unitarily from the earth for adjusting and transporting purposes and the rudder member and disc blades are simultaneously brought into earth engagement by lowering the tool bar.

Although the described structure is eminently satisfactory when sufficiently light weight to permit the described elevational movement, the production of reversible plows of larger size and heavier weight precluded such elevational movement on a tool bar because of limitations in power available to lift the tool bar, tractor balance and the like. In such heavier implements, it is desirable to provide a support vehicle borne on earth engaging wheels which permit convenient earth traversing movement of the vehicle but at least one of which wheels is adapted for automatic angling in the manner of the described rudder member automatically to resist lateral thrust of disc blades or the like borne by the vehicle in earth engagement.

An object of the present invention is, therefore, to provide an improved support vehicle for agricultural implements and the like which automatically compensates for lateral thrust generated by earth working tools borne thereby in earth engagement or comparable thrust producing members and provides support for such earth working tools when elevated above the earth for transporting purposes devoid of any lateral thrust compensating effect.

Another object is to provide an improved reversible plow permitting an increase in size and weight thereof beyond previous limits.

Another object is to provide a support vehicle having provision for the adjustable elevational positioning of opposite ends thereof in relation to the surface of earth traversed.

Another object is to provide a support vehicle having provision for the adjustable elevational positioning of opposite ends thereof in relation to earth traversed and means automatically providing directional control of the vehicle when the frame is lowered relative to the earth traversed so as to engage earth working tools borne thereby with the earth.

Another object is to provide a guidable wheel support for draft frames and the like including a swivel support wheel and guide means automatically connected in guiding relation to the swivel wheel in response to elevational movement of such a frame into predetermined elevational relation with the swivel wheel.

Further objects and advantages are to provide improved elements and arrangements thereof in a device of the character described that is fully effective in its operation, economical to produce, and of durable character.

Still further objects and advantages will become apparent in the subsequent description in the specification.

In the drawings:

Fig. 1 is a plan view of a reversible plow embodying the principles of the present invention adjusted to discharge encountered earth laterally to the right of a line of draft.

Fig. 2 is a side elevation of the reversible plow shown in Fig. 1 illustrating disc blades thereof lowered into earth engagement.

Fig. 3 is a side elevation of the reversible plow similar to Fig. 2 but showing the disc blades elevated from earth engagement as for transporting or adjustment purposes.

Fig. 4 is a fragmentary plan view of the rear end of the reversible plow illustrating a guided swivel support wheel positioned to resist lateral thrust of the disc blades when the disc blades are positioned to discharge encountered earth laterally to the left of a line of draft.

Fig. 5 is a somewhat enlarged vertical section and partial elevation taken approximately on line 5—5 of Fig. 1.

Fig. 6 is a horizontal section taken on line 6—6 of Fig. 5.

Fig. 7 is a foreshortened, somewhat enlarged, fragmentary section, as taken on the offset line 7—7 of Fig. 1.

Fig. 8 is a somewhat enlarged transverse section taken on line 8—8 of Fig. 1 but showing in transverse section a pivotally mounted beam in central position as distinguished from its position in Fig. 1 wherein it is rotated in a clockwise direction, as viewed, to the full extent of its permissible movement.

Referring in greater detail to the drawings:

A draft frame is indicated generally at 10 having a forward end portion 11 and a rearward end portion 12. The forward end portion of the frame is mounted in elevationally adjustable relation on a pair of laterally spaced support wheels 13. The rearward end portion of the frame is mounted in adjusted elevational relation on a guidable swivel wheel 14.

The draft frame 10 conveniently comprises a pair of forwardly divergent bars 16 having rearward end portions interconnected in fixed spaced relation by a lower channel member 17 and an upper plate member 18 welded or otherwise secured to the bars, as shown in Fig. 8.

The forward ends of the bars 16 are interconnected by an arcuate track 19, evident in Fig. 7, concentric to a point midway between the rearward end portions of the bars 16. An arcuate angle iron member 20 also interconnects the forward end portions of the bars 16 above the track 19 and is also concentric to a point midway between the rear end of the bars 16. The track and member 20 are disposed in horizontal parallel planes.

A pair of laterally spaced inner brackets 24 are rigidly mounted on the arcuate angle member 20 and forwardly extending therefrom in parallel, substantially equally spaced, relation to an imaginary line radial to the angle iron member 20 and track 19 equidistant from the bars 16. A pair of outer brackets 25 are rigidly mounted on the angle iron member 20 laterally adjacent to the inner brackets and forwardly extended in parallel relation thereto. A pivot bolt 26 is extended between each of the inner brackets and its respectively adjacent outer bracket forwardly of the angle iron member 20. A leg 27 is pivotally mounted on each of the bolts 26 and has an end downwardly and forwardly extended therefrom and an opposite end rearwardly and upwardly extended therefrom to a position above the angle iron member 20. The support wheels 13 are individually rotatably mounted on the forwardly extended ends of the legs, as at 28.

A toggle 30 is pivotally connected to the forward end portion of each of the inner brackets 24 for vertical movement and a bar 31 is connected between the toggles. A draft tongue 32 is connected centrally of the bar 31 and forwardly extended therefrom. Bracing struts 33 interconnect the tie bar and the tongue in bracing relation.

A rock shaft 35 is journaled in the inner brackets 24 transversely of the frame 10 forwardly and above the forwardly extended ends of the legs 27, as evident in Figs. 2 and 3. The legs 27 conveniently provide inwardly extended plate portions 36. Control arms 37 are rigidly extended radially from the rock shaft forwardly above the plates 36 and rollers 38 rotatably mounted thereon for plate engagement. A control lever 39 is upwardly extended from the rock shaft 35 for controlled positioning of the shaft and thus the control arms 37.

A two-way hydraulic ram 42 is mounted in any convenient position on the frame 10, as on a longitudinal bar 43 connected between the plate 18 and the angle iron member 20 provided for that purpose. The ram is connected to the control lever 39 and by manipulation of the ram in the well known manner the rock shaft is rotatably positioned in the brackets 24.

A beam 45 of box steel or other suitable material is pivotally mounted in the frame 10 by a pin 46 vertically positioned between the lower channel member 17 and upper plate member 18. The beam is oppositely horizontally extended from its pivotal mounting and, as shown in Fig. 7, provides an endwardly extended flange 47 positioned below the arcuate angle iron member 20 between the track 19 and said member. A peripherally grooved roller 48 is rotatably mounted on the forward end of the beam in rolling engagement with the track.

A plurality of tool posts 50 are rotatably mounted in the beam 45 in substantially equally spaced relation and downwardly extended therefrom. A plow disc blade 51 is rotatably mounted on the lower end of each post in earth engaging attitude. Plow control arms 52 are radially extended from the tool posts above the beam 45 and a rigid push-pull bar 53 is pivotally connected between the radially extended ends of the control arms. The mounting of the arms and the connection to the bar are such that the tool posts and their disc blades are constrained to substantially uniform rotational positioning in the beam.

The draft frame 10 also includes a rearwardly extended tail wheel bracket 56 welded or otherwise secured to the upper plate 18 and rearwardly extended therefrom. The pin 46 extends upwardly through the forward end portion of the bracket 56. A cam plate 57 is forwardly extended from the bracket 56 centrally of the frame 10. As shown in Figs. 1, 2, 3, and 7, a plow positioning arm 58 having a longitudinal slot therein is rigidly rearwardly extended radially from a tool post 50 from a position forwardly adjacent to the cam plate 57 to a position elevationally adjacent to the cam plate. A cam follower 59 is mounted in radially adjustable position on the cam plate and in slidable engagement with the longitudinal slot in the arm 58. It will be seen that as the beam 45 is pivoted from one side of the frame 10 to the other with the forward end portion supported on the track 19, the operation of the cam follower in the slot will automatically reverse the positions of the plow blades 51 so that they discharge encountered earth laterally in a direction opposite to that previously effected. The extent of the pivotal positioning of the plow blades 51 in the beam 45 is adjustable by the adjustable positioning of the cam follower 59 longitudinally of the cam plate.

It will be apparent that any desired mechanical, hydraulic, pneumatic or manual system desired may be employed pivotally to position the beam 45 in the frame 10. A suitable system is exemplified in the drawings consisting of a beam positioning lever 64 rigidly mounted on the beam 45 adjacent to the pin 46 and laterally extended therefrom. A bracket 65 is mounted on one of the bars 16 of the draft frame forwardly of the lever 64 and a two-way ram 66 pivotally connected between the bracket and the lever. Hydraulic fluid under pressure is selectively directed to opposite ends of the ram 66 to pivot the beam 45 in the frame and to opposite ends of the ram 42 to raise and lower the frame by any suitable hydraulic system. Such systems being well known in the art, they are not described in greater detail at this point.

When the ram 66 is extended, the beam 45 is pivoted in a clockwise direction, as viewed in Fig. 1, to move the forward end portion of the beam to the right in the frame. When the ram is contracted, the beam is moved in a counterclockwise direction to the position shown in Fig. 4. At opposite limits of its pivotal movement, the forward end portion of the beam 45 is adjacent and below the rearwardly extended ends of the legs 27. As indicated in Fig. 7, a stop bracket 68 is rigidly mounted on the forward end portion of the beam 45 and forwardly extended over the arcuate angle iron member 20. The forward end portion of the stop bracket preferably mounts a transverse plate 69 arcuately concentric to the pivotal mounting of the beam. A stop bolt 70 is screw-threadably mounted in the rearward end portion of each of the legs 27 and downwardly extended therefrom for engagement with the plate 69 when the forward end portion of the beam 45 is therebelow. The plate 69 assures engagement of the stop bolt 70 therewith whenever the forward end portion of the beam approaches the limit of its pivotal movement. In other words, whenever the beam 45 is in operating position, the forward end portion thereof is so positioned that one of the stop bolts will strike the plate 69 and by such engagement limits upward pivotal movement of its respective leg 27 and thus automatically limits the depth of descent of the side of the forward end portion of the frame on which the leg is mounted. It will be apparent, that the opposite leg is not limited by the engagement of its stop bolt with the plate 69 and thus exercises no appreciable supporting effect on the frame. The support wheel 13 whose leg is limited in its pivotal movement by stop bolt and plate egagement provides accurate control of depth of earth engagement of the disc blades 51 with encountered earth.

As illustrated in detail in Fig. 5, a bearing 73 is formed in the rearward end portion of the tail wheel bracket 56 in a substantially erect position. A sleeve 74 is rotatably mounted in the bearing 73. The sleeve is extended upwardly and downwardly from the bearing 73. A guide arm or guide bracket 75 is rigidly mounted on the upper end of the sleeve 74 in engagement with the upper end of the bearing 73 and radially extended therefrom, as evident in Fig. 1. The guide bracket rests on the upper end of the bearing and functions as a thrust stop in limiting downward movement of the sleeve in the bearing. A detent member 76 is rigidly mounted in circumscribing relation on the lower end of the sleeve 74 in abutting relation to the lower end of the bearing 73. The detent member and guide arm in bearing engagement serve longitudinally to position the sleeve in the bearing.

An elongated shaft 78 is rotatably mounted in the sleeve 74 and permitted axial slidable movement therein. The shaft has an upper end portion upwardly extended from the sleeve and a lower end portion downwardly extended from the sleeve. A bifurcated yoke 79 is pivotally mounted on the lower end portion of the shaft 78 and rearwardly extended therefrom. The guidable swivel wheel 14 is rotatably mounted in the rearwardly extended end of the yoke. A foot member 80 is rigidly mounted on the lower end portion of the shaft and has a forwardly directed guide plate or extension 81 and a rearwardly directed extension 82. A coupler 83 is rotatably mounted transversely between the legs of the yoke 79. A bolt 84 is upwardly extended from the coupler through the rearward extension 82 and stop nuts 85 screw-threadably mounted on the bolt on opposite sides of the rearward extension. It will be apparent that adjustable positioning of the nuts 85 on the bolt 84 permits the adjustable pivotal positioning of the yoke 79 on the shaft 78 and thus the elevation of the shaft relative to the guidable swivel wheel 14.

The guide plate 81 has a detent recess or notch 87 formed therein, as shown in Fig. 6. A detent 88 integral with the detent member 76 is downwardly extended for releasable engagement with the side walls of the recess 87.

A cap 90 is releasably mounted by any suitable means, not shown, on the upper end of the shaft 78 and a helical compression spring 91 located under initial compression between the cap and the guide arm 75. A roller 92 is rotatably mounted on a horizontal axis in the top of the cap 90.

A bracket 95 is mounted on the rearward end portion of the bar 43, as evident in Figs. 2 and 3. A pair of spaced straps 96 are pivotally mounted on the bracket 95 and rearwardly extended to a position above the roller 92. A roller plate 97 interconnects the rearward end portions of the straps 96 and provides engagement with the roller 92. An elongated guide finger 98 is weldably or otherwise secured to the cap 90 and upwardly extended therefrom between the straps 96 so that the axis of rotation of the roller 92 is always in substantially right angular relation to the straps 96. A control lever 100 is pivotally mounted on the tail wheel bracket 56, as at 101, and upwardly extended therefrom between the straps 96. A longitudinally adjustable tension member 102 pivotally interconnects the upwardly extended end portion of the control lever 100 and the control lever 39 of the rock shaft 35. A link 103 pivotally interconnects the control lever 100 and the straps 96 adjacent to the rearward end portion thereof. It will be apparent that forward pivotal movement of the control lever 100 draws the straps 96 downwardly and by rolling engagement of the plate 97 with the roller 92, the shaft 78 is thrust downwardly relative to the frame to achieve elevational movement of the rearward end portion of the frame on the guidable swivel wheel 14.

As shown in Fig. 8, an arm 105 is fixed to and extends radially from the pin 46 and a telescopically adjustable push-pull member 106 is pivotally connected between the laterally extended end of the guide arm 75 and the arm 105. Inasmuch as the arm 105 must move unitarily with the beam 45, the pin 46 is rigidly secured to the beam and to the arm 105 in any convenient manner, such as by a rivet 107 extended through the beam and the pin and provided with heads on opposite sides thereof and a rivet 108 similarly extended through the arm 105 and the pin.

Operation

The operation of the device of the present invention is believed to be clearly apparent and is briefly summarized at this point. The forward end portion of the tongue 32 is connected to any suitable draft appliance, not shown, and the draft frame 10 drawn along a desired path of earth traversing movement.

The ram 66 is telescopically adjusted to pivotally position the beam 45 in the draft frame 10, as desired for operation. When it is desired to plow to the right of a line of draft, the forward end portion of the beam is moved to the right by telescopic extension of the ram, as shown in Fig. 1. When it is desired to plow to the left of a line of draft, the ram is contracted to position the beam as shown in Fig. 4.

The positioning of the disc blades 51 in the beam 45 is automatically accomplished by the engagement of the cam follower 59 in the slot of the cam plate 57, as previously described. The adjustable positioning of the beam 45 and the preconditioning of the disc blades 51 for operation is best achieved with the draft frame 10 sufficiently elevated for the blades to clear the surface of earth traversed, as indicated in Fig. 3. This is achieved by extending the ram 42 whereby the control lever 39 is thrust forwardly and the rock shaft 35 rotated in a clockwise direction, as viewed. Such rotation of the rock shaft, forces the forward end portions of the control arms 37 downwardly which in rolling engagement with the plate portions 36 of the legs 27 pivots the forward end portions of the legs downwardly and thus elevates the forward end portion 11 of the frame 10 on the support wheels 13. Concurrently the tension member 102 draws the upper end portion of the control lever 100 forwardly thrusting the roller plate 97 downwardly on the roller 92 thus elevating the rearward end portion of the frame on the guidable swivel wheel 14. It will be noted that the elevational movement of the rearward end 12 of the frame relative to the shaft 78 and swivel wheel 14 raises the detent 88 from engagement with the recess 87 in the plate like forward extension 81 freeing the shaft for uncontrolled swivel movement of the wheel 14. In such condition, not only is the beam 45 conveniently positioned in the frame 10 but the frame is towed in earth traversing movement to a position of operation with the wheel 14 providing free swivel support.

Plowing operation is initiated by contracting the ram 42 so as to rotate the rock shaft 35 in a counterclockwise direction, as viewed. This permits upward pivotal movement of the forward end portions of the legs 27 and thus descent of the forward end 11 of the frame. With the forward end portion 45 of the beam in operable position, the stop bolt 70 mounted in the rearward end portion of the leg 27 at the side of the frame toward which the forward end portion of the beam 45 is directed rests on the arcuate plate 69 and thus the extent of pivotal movement of the leg limited as desired. The opposite leg 27 is free to pivot and thus its support wheel exercises no appreciable support effect. To preclude the leg pivoting backwardly under the frame, each leg is preferably provided with a stop, not shown, engageable with its respective inner and outer brackets 24 and 25.

Concurrently, the rearward end 12 of the frame 10 is permitted to descend under the urging of the spring 91 and the weight of the rearward end portion of the frame by rearward movement of the control lever 100. Downward movement of the frame lowers the detent 88 relative to the forward plate extension 81 and the detent either enters the recess 87, if they are properly aligned, or rides on the top of the plate extension until proper alignment occurs. Engagement of the detent in the recess establishes direction controlling connection between the sleeve 74 and the shaft 78 mounting the guidable swivel wheel 14. To facilitate reception of the detent by the recess, the lower end portion of the detent is preferably cuneiform.

When the disc blades 51 are lowered into earth engagement, as shown in Fig. 2, a considerable portion of the weight of the entire structure is imposed upon the disc blades and thus borne by the beam 45. Although the beam is of rigid material, it is found that sufficient flexibility is always present therein so that the weight of the frame causes the arcuate angle iron member 20 to descend on the flange 47 frictionally to aid in maintaining the beam in predetermined operable position.

It will be apparent that the ram 42 may incorporate well known adjustable stops to limit extent of expansion and contraction thereof and thus pivotal movement of the control lever 39. Adjustment of the length of the tension member 102 serves to regulate the relative elevational movements of the forward and rearward end portions of the frame incident to operation of the ram 42. Adjustable positioning of the nuts 85 on the bolt 84 in engagement with the rearward extension 82 provides an additional means for regulating the elevation of the rearward end portion of the frame.

Screw-threaded adjustment of the stop bolts 70 in their respective legs 27 serves to provide accurate depth control of the disc blades 51 mounted adjacent to the forward end of the beam 45.

Telescopic adjustment of the push-pull member 106 provides accurate regulation of the guidable positioning of the wheel 14 in relation to pivotal positioning of the beam 45 when the frame is lowered and the detent 88 received in the recess 87 whereby compensation for lateral thrust of the disc blades is accurately provided.

Adjustable positioning of the cam follower 59 radially in the positioning arm 58 serves to regulate the ratio of pivotal positioning of the disc blades 51 in the beam 45 incident to pivotal positioning of the beam.

The device of the present invention permits the construction of reversible two-way plows and the like of size and weight limited only to strengths of materials employed. When the frame 10 is elevated, the swivel wheel 14 is freed so that it has no thrust compensating effect and the frame may be trundled about at will. When the frame is lowered for earth engagement of the blades 51, controlled connection is established between the beam 45 and the swivel wheel 14 whereby said wheel is automatically canted to resist thrusts laterally of the frame by the blades 51.

The discussed structure has been found to be fully automatic in its described operation. It is relatively simple in structure and of durable form.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An agricultural implement comprising a frame having forward and rearward end portions, a beam mounted in the frame for horizontal pivotal movement between opposite operational positions in the frame, earth working means borne by the beam having a thrust laterally of the frame in one direction when engaged with the earth with the beam in one operational position and an opposite direction of lateral thrust with the beam in its other operational position, ground engaging support means, means mounting the forward end of the frame on the support means for adjustable elevational movement relative to the support means, a ground engaging guide wheel, means mounting the rearward end of the frame on the guide wheel for adjustable elevational movement relative to the guide wheel and for swivel movement of the guide wheel in the frame, and a control linkage interconnecting the beam and the guide wheel for interlocked corresponding pivotal movement in the frame when the frame is in lowered position relative to the guide wheel, said linkage being disconnected to free the guide wheel for swivel movement when the frame is elevated to a raised position relative to the guide wheel.

2. An agricultural implement comprising a frame having forward and rearward end portions, a beam mounted in the frame for horizontal pivotal movement between opposite operational positions in the frame, earth working means borne by the beam having a thrust laterally of the frame in one direction when engaged with the earth with the beam in one operational position and an opposite direction of lateral thrust with the beam in its opposite operational position, ground engaging support means, means mounting the forward end of the frame on the support means for adjustable elevational movement relative to the support means, a ground engaging guide, swivel means mounting the rearward end of the frame on the guide for adjustable elevational movement of the frame on the guide and free swiveling movement of the guide relative to the frame, an elevational control linkage interconnecting the mounting means and the swivel mounting means for corresponding elevational movement of opposite ends of the frame on the support means and guide, and a directional control linkage interconnecting the beam and the guide wheel for interlocked corresponding pivotal movement in the frame when the frame is in lowered position relative to the guide wheel, said linkage being disconnected to free the guide wheel for swivel movement when the frame is elevated to a raised position relative to the guide wheel.

3. In an agricultural implement the combination of an elongated frame having forward and rearward end portions, a beam mounted in the frame for horizontal pivotal movement between opposite operational positions in the frame, earth working means borne by the beam having a thrust laterally of the frame in one direction when engaged with the earth with the beam in one operational position and an opposite direction of lateral thrust with the beam in its opposite operational position, a draft connection mounted on the forward end of the frame adapted for coupling to a draft appliance, support wheels, means mounting the forward end portion of the frame on the support wheels for elevational movement of the frame relative to the wheels, a guide wheel, a yoke having the guide wheel rotatably mounted therein and providing a shaft extended upwardly from the wheel, means rotatably mounting the shaft in the frame for reciprocal axial movement relative to the frame with the guide wheel in swiveling earth engagement, the mounting means for the shaft including a sleeve rotatably mounted on the shaft and rotatably mounted in the frame, means interconnecting the sleeve and the beam for rotatably positioning the sleeve in the frame in response to pivotal movement of the beam, and means responsive to movement of the frame axially of the shaft providing rigid interconnection of the sleeve and the shaft at a predetermined relative elevational position of the frame on the shaft.

4. An agricultural implement comprising an elongated frame having forward and rearward end portions, a beam mounted in the frame for horizontal pivotal movement between opposite operational positions in the frame, earth working means borne by the beam having a thrust laterally of the frame in one direction when engaged with the earth with the beam in one operational position and an opposite direction of lateral thrust with the beam in its opposite operational position, a draft connection mounted on the forward end portion of the frame, a pair of support wheels, means mounting the forward end portion of the frame in adjustable elevational position on the support wheels, a shaft, means rotatably mounting the shaft in a substantially erect position in the rearward end portion of the frame for reciprocal axial movement relative to the frame, a yoke mounted on the lower end of the shaft, a guide wheel rotatably mounted in the yoke in ground engagement, the mounting means for the shaft including a sleeve rotatably mounted on the shaft and rotatably mounted in the frame, means interconnecting the sleeve and the beam for rotatably positioning the sleeve relative to the frame in response to pivotal movement of the beam in the frame, a plate having a detent recess therein fixedly mounted on the shaft, a detent fixedly mounted on the sleeve engageable with the recess in the plate at a predetermined position of elevational movement of the shaft relative to the sleeve, and control means interconnecting the mounting means of the support wheels and the shaft for corresponding elevational movement of opposite ends of the frame relative thereto whereby the shaft is axially adjustably positioned relative to the sleeve to move the detent to and from receptacle engagement.

5. In an agricultural implement the combination of a draft frame having forward and rearward end portions, a beam mounted in the frame for horizontal pivotal movement between opposite operational positions in the frame, earth working means borne by the beam having a thrust laterally of the frame in one direction when engaged with the earth with the beam in one operational position and an opposite direction of lateral thrust with the beam in its opposite operational position, means connected to the beam at a position spaced from its pivotal mounting in the frame for shifting the beam selectively between its operational positions, ground engaging means mounting the forward end of the frame for adjustable elevational positioning, a guide wheel swively mounted in the rearward end of the frame for adjustable elevational positioning of the frame on said guide wheel, means interconnecting the ground engaging means and the guide wheel for corresponding elevational positioning of the forward and rearward ends of the frame thereon, and a control linkage interconnecting the beam and the guide wheel for interlocked corresponding pivotal movement in the frame when the frame is in lowered position relative to the guide wheel, said linkage being disconnected to free the guide wheel for swivel movement when the frame is elevated to a raised position relative to the guide wheel.

6. An agricultural implement comprising an elongated frame having forward and rearward end portions, an elongated beam pivotally mounted in the draft frame for horizontal reciprocal movement of a forward end thereof between alternate positions at opposite sides of the draft frame, earth working tools borne by the beam having a thrust laterally of the draft frame when engaged with the earth when the forward end of the beam is at one side of the draft frame and an opposite direction of thrust when the forward end of the beam is at the opposite side of the draft frame, a draft connection mounted on the forward end portion of the frame, a pair of laterally spaced legs pivotally mounted on the forward end portion of the frame and forwardly and downwardly extended therefrom and upwardly and rearwardly extended therefrom over the positions assumed by the forward end of the beam at opposite sides of the frame, stops mounted on the upper ends of the legs for beam engagement, a support wheel rotatably mounted on the downwardly extended end of each leg, a rock shaft rotatably mounted transversely in the forward end portion of the frame, control arms radially extended from the rock shaft into leg engagement, control means connected to the rock shaft adapted rotationally to position the same and through the control arms to thrust the forward ends of the legs downwardly relative to the frame to raise the frame on the support wheels, a bearing in a substantially erect position in the rearward portion of the frame, a sleeve rotatably mounted in the bearing, a guide bracket rigidly mounted on the sleeve in engagement with the upper end of the bearing, a shaft journaled in the sleeve and upwardly and downwardly extended therefrom, a bifurcated yoke mounted on the lower end portion of the shaft, a guide wheel rotatably mounted in the yoke in ground engagement, a plate rigidly mounted transversely on the shaft below the sleeve and having a detent recess therein, a detent rigidly mounted on the sleeve in abutting relation with the lower end of the bearing and downwardly extended for releasable engagement in the detent recess, a spring mounted under initial compression between the upper end of the sleeve and the upper end of the shaft, directional control means connected to the bracket for rotational positioning of the sleeve in the frame, and an elevational control linkage interconnecting the upper end of the shaft and the rock shaft whereby the rearward end of the frame is lowered and raised on the guide wheel in response to raising and lowering of the forward end of the frame on the support wheels and the detent moved to and from engagement respectively with the detent recess in the plate.

7. In an agricultural implement, an elongated frame having opposite end portions, a beam pivotally mounted in the frame for horizontal reciprocal movement of an end thereof between alternate positions at opposite sides of the frame, earth working tools borne by the beam, a pair of laterally spaced legs pivotally mounted on opposite sides of an end portion of the frame and downwardly extended therefrom substantially longitudinally of the frame, a support wheel rotatably mounted on the extended end of each leg for rotation about an axis substantially parallel to the pivotal axis of its respective leg, control arms pivotally mounted in the frame adjacent to the legs individually engageable with the legs in spaced relation to the pivotal mounting thereof in the frame, control means having controlling connection to the control arms adapted rotationally to position the same and through engagement of the control arms with the legs to thrust the extended ends of the legs downwardly relative to the frame, each or the legs having a portion extended over the position assumed by the beam when said beam is pivotally positioned at the leg's respective side of the frame, and stops mounted in said extended portions and engageable with the beam adapted to limit upward pivotal movement of the downwardly extended ends of their respective legs relative to the frame by such engagement.

8. In an agricultural implement having a frame providing forward and rearward end portions, an elongated beam pivotally mounted in the draft frame for horizontal reciprocal movement of a forward end thereof between alternate positions at opposite sides of the draft frame, earth working tools borne by the beam having a thrust laterally of the draft frame when engaged with the earth when the forward end of the beam is at one side of the draft frame and an opposite direction of thrust when the forward end of the beam is at the opposite side of the draft frame, a pair of legs pivotally mounted in laterally spaced relation at the forward end of the draft frame each having an end forwardly and downwardly extended from the frame and an opposite end rearwardly and upwardly extended over the position assumed by the forward end of the beam when positioned at the leg's respective sides of the frame, adjustable stops mounted on the rearward ends of the legs for beam engagement, support wheels mounted on the forward ends of the legs, a rock shaft rotatably mounted transversely of the frame adjacent to the legs, control arms radially extended from the rock shaft above the legs for leg engagement, and control means connected with the rock shaft adapted rotationally to position the rock shaft and through the control arms to thrust the forward ends of the legs downwardly relative to the frame to raise the frame.

9. In a reversible disc plow, a frame having opposite end portions, a plow beam pivotally mounted in the frame for horizontal pivotal movement between predetermined operational positions at opposite sides of the frame, plow blades borne by the beam adapted selectively to plow earth to opposite sides of the frame in response to opposite pivotal positioning of the beam in the frame, a pair of gage wheels, and means connected to an end portion of the frame mounting said end portion of the frame for free floating movement individually on the wheels, said means being alternately and oppositely engageable with the beam when the beam is positioned at said means respective side of the frame and being conditioned by said engagement to support the frame in predetermined elevation on its respective wheel and disengageable from the beam whereby its respective wheel is freed for free floating movement relative to the frame.

10. In an agricultural implement, a frame having a forward end portion and a rearward end portion, a beam mounted in the frame for horizontal reciprocal movement of an end thereof between alternate predetermined positions at opposite sides of the forward end portion of the frame, earth working tools borne by the beam, a pair of laterally spaced legs pivotally mounted on opposite sides of the frame for pivotal movement about axes transversely of the frame and having end portions extended from the frame, means supporting the extended end portion of each leg for earth traversing movement, each of the legs having an upper end portion extended over the position assumed by the beam when said beam is positioned at the leg's respective side of the frame, and stops mounted on the upwardly extended ends of the legs for beam engagement.

11. In a reversible disc plow, a frame having forward and rearward end portions, a beam pivotally mounted in the frame for horizontal reciprocal movement of an end thereof between alternate positions at opposite sides of the forward end portion of the frame, plow blades borne by the beam adapted to plow earth selectively to opposite sides of the plow in response to opposite pivotal positioning of the beam in the frame, a pair of laterally spaced legs pivotally mounted on a common horizontal axis transversely of an end portion of the frame at positions individually adjacent to the alternate positions of the beam and downwardly extended therefrom longitudinally of the frame, a support wheel rotatably mounted on the extended end of each leg for rotation about an axis substantially parallel to the pivotal axis of the legs, controlled means with the legs for raising and lowering the frame relative to the wheels, each of the legs having a portion extended over the position assumed by the beam when said beam is positioned at the leg's respective side of the frame, and stops mounted on the portions of the legs extended over the alternate positions of the beam for beam engagement whereby the legs at the sides of the frame adjacent to which the end of the beam is alternately positioned are alternately limited in their upward pivotal movement by engagement of their stops with the beam so as to constitute alternately employed depth control gages for the plow.

12. In an agricultural implement having a support frame providing forward and rearward end portions, a beam pivotally mounted in the frame on a substantially vertical axis for reciprocal horizontal movement in the frame between alternate predetermined operating positions at opposite sides of the frame, earth working tools borne by the beam in earth engagement exerting opposite lateral thrusts on the beam in its alternate positions during earth traversing movement, means for controllably positioning the beam in its alternate positions in the frame, and powered means adjustably elevationally supporting the forward end portion of the frame whereby the frame can be selectively raised and lowered to raise and to lower the earthworking tools; the combination of a shaft, means rotatably mounting the shaft in a substantially erect position in the rearward end portion of the frame, a bifurcated yoke downwardly and rearwardly extended from the shaft, a combined guide and swivel wheel rotatably mounted in the yoke, a guide plate having a detent recess therein rigidly mounted on the shaft and forwardly extended therefrom, the mounting means for the shaft including a sleeve rotatably mounted on the shaft and rotatably mounted in the frame, means connected to the sleeve responsive to pivotal movement of the beam in the frame rotatably positioning the sleeve on the shaft correspondingly in direction to pivotal movement of the beam in the frame, a detent borne by the sleeve engageable in the detent recess of the guide plate to interlock the sleeve and the plate and disengageable therefrom for independent movement of the sleeve and plate, and means having controlled connection to the powered elevationally adjustable means engaging the detent with the guide plate when the forward end portion of the frame is lowered and disengaging the detent from the plate when the forward end portion of the frame is raised.

13. In an agricultural implement having a support frame providing forward and rearward end portions, earthworking tools borne in the frame, and powered means adjustably elevationally supporting the forward end portion of the frame whereby the frame can be selectively raised and lowered to raise and to lower the earthworking tools; a support for the rearward end portion of the frame comprising a shaft rotatably mounted in a substantially erect position in the rearward end portion of the frame, a yoke arm downwardly and rearwardly extended from the shaft, a combined guide and swivel wheel rotatably mounted on the arm, a guide plate rigidly mounted on the shaft and outwardly extended therefrom, a sleeve rotatably mounted on the shaft, guide means connected to the sleeve for controlled rotational positioning of the sleeve on the shaft, a detent mounted on the sleeve engageable with the guide plate to interlock the sleeve and guide plate and disengageable therefrom for independent movement of the sleeve and guide plate, and means having controlled connection to the powered elevationally adjustable means and to the detent positioning the detent in interlocking position when the forward end portion of the frame is lowered and retracting the detent when the forward end portion of the frame is raised.

14. In an agricultural implement, a frame having opposite sides, a beam mounted in the frame for horizontal reciprocal movement between predetermined alternate positions at opposite sides of the frame, earth working tools borne by the beam, a pair of axially spaced substantially parallel support wheels located adjacent to opposite sides of the frame, means individually mounting the wheels on their respective sides of the frame for free upward and downward floating movement relative to the frame, said mounting means each having stops integral therewith disposed for engagement with the beam when the beam is located at said means' respective side of the frame and by such engagement to limit downward movement of the frame relative to the wheel of said mounting means, and frame elevation control means mounted on the frame for engagement with the mounting means correspondingly to elevate opposite sides of the frame on said mounting means and wheels thereof and disengageable from said mounting means to release the same for free individual upward and downward movement relative to the frame.

15. In an agricultural implement, an elongated frame, a beam mounted in the frame for horizontal oscillating movement between predetermined alternate positions at opposite sides of the frame, earth working tools borne by the beam, a pair of laterally spaced legs pivotally mounted in the frame for independent upward and downward pivotal movement relative to the frame, said legs having lower end portions downwardly extended from the frame substantially longitudinally thereof and opposite upper end portions providing stops individually adjacent to the predetermined alternate positions of the beam, a support wheel rotatably mounted on the downwardly extended end portion of each leg, and elevational control means operatively associated with the legs correspondingly to pivot the downwardly extended portions thereof downwardly from the frame to raise the frame on the support wheels and releasable to free the legs for independent pivotal movement, the upper end portion of each leg being freely pivotal to move its stop into its respectively adjacent beam position when the beam is removed therefrom, each stop being retracted from its said respectively adjacent beam position upon downward pivotal movement of the lower end portions of the legs, and each stop being blocked from pivotal movement into its said adjacent beam position by the presence of the beam therein whereby the frame is supported on the leg adjacent to whichever of the alternate positions are assumed by the beam.

16. In an agricultural implement, a frame having opposite sides, a beam mounted in the frame for horizontal reciprocal movement between predetermined alternate positions at opposite sides of the frame, earth working tools borne by the beam, a pair of spaced support means located respectively adjacent to opposite sides of the frame, means individually mounting the support means on their respective sides of the frame for free upward and downward floating movement relative to the frame, said mounting means each having stops integral therewith disposed for engagement with the beam when the beam is located at said mean's respective side of the frame and by such engagement to limit downward movement of the frame relative to the support means of said mounting means, and frame elevation control means mounted on the frame and operatively associated with the mounting means correspondingly to elevate opposite sides of the frame on said mounting means and support means thereof and releasable to permit free individual upward and downward movement of the mounting means and respective support means relative to the frame.

References Cited in the file of this patent

UNITED STATES PATENTS

| | | |
|---|---|---|
| 717,087 | Fairbank | Dec. 30, 1902 |
| 732,626 | Fox | June 30, 1903 |
| 739,731 | Simeral | Sept. 22, 1903 |
| 773,608 | Wagner | Nov. 1, 1904 |
| 929,070 | Young | July 27, 1909 |
| 1,318,978 | Dickinson | Oct. 14, 1919 |
| 1,323,887 | McKay | Dec. 2, 1919 |
| 2,044,718 | Rutter | June 16, 1936 |
| 2,084,629 | Coviello | June 22, 1937 |
| 2,163,832 | Coviello | June 27, 1939 |
| 2,202,348 | Leach | May 28, 1940 |